United States Patent [19]
Provost et al.

[11] Patent Number: 4,757,837
[45] Date of Patent: Jul. 19, 1988

[54] SEPARATING VALVE FOR DISCHARGING THE LIQUID PHASE OF A TWO-PHASE FLUID

[75] Inventors: Jean-Claude Provost, Demigny; Marcel Provost, Corcelles-Les-Arts; Alain Carpentier, Paris, all of France

[73] Assignees: Compagnie Parisienne de Chauffage Urbain; Robinetterie Industrielle de Saone et Loire, both of Chagny, France

[21] Appl. No.: 71,360

[22] Filed: Jul. 9, 1987

[30] Foreign Application Priority Data

Jul. 17, 1986 [FR] France .................. 86 10393
Apr. 7, 1987 [FR] France .................. 87 04881

[51] Int. Cl.⁴ .................................. F16T 1/20
[52] U.S. Cl. .......................... 137/192; 137/434
[58] Field of Search ............ 137/192, 434, 399; 251/368

[56] References Cited

U.S. PATENT DOCUMENTS

| | | | |
|---|---|---|---|
| 291,374 | 1/1884 | McHugh | 137/434 X |
| 1,566,238 | 12/1925 | Swendeman | |
| 1,579,140 | 3/1926 | Phillips | 137/434 |
| 2,117,056 | 5/1938 | Dunn | 137/103 |
| 2,258,450 | 10/1941 | Graham | 137/192 X |
| 3,458,172 | 7/1969 | Burrows | 251/268 X |
| 3,583,672 | 6/1971 | Haller | 251/268 X |

FOREIGN PATENT DOCUMENTS

| | | | |
|---|---|---|---|
| 620063 | 12/1925 | France | 137/192 |
| 726097 | 5/1932 | France | |
| 631753 | 11/1949 | United Kingdom | |
| 911167 | 11/1962 | United Kingdom | 137/192 |

*Primary Examiner*—Alan Cohan
*Attorney, Agent, or Firm*—Oblon, Fisher, Spivak, McClelland & Maier, P.C.

[57] ABSTRACT

The separating valve is intended for discharging the liquid phase of a two-phase fluid. It comprises a seating and a valve member, the latter being actuated to open by a float at the end of a first arm of a lever, whose other arm comprises a cam which engages in a neck of the shank of the valve member. The seating comprises a port at the center of a flat face from which projects a sleeve for guiding the shank of the valve member. Directed towards the flat face, the valve member comprises a flat plate from which there projects a truncated conical valve needle. Between seating and valve member there is defined an annular space communicating by three passageways with the chamber for receiving the liquid phase: one passageway which is an extension of a slot where the lever arm fits, and two passageways along a diameter perpendicular to the slot and tangential to the flat face. The guidance of the valve member and the disposition of the passageways guarantee precise and reproducible location of the valve member on the seating, in order to reduce losses to a minimum.

10 Claims, 3 Drawing Sheets

SEPARATING VALVE FOR DISCHARGING THE LIQUID PHASE OF A TWO-PHASE FLUID

FIELD OF THE INVENTION

The invention relates to a separating valve for discharging the liquid phase of a pressurized two-phase fluid, comprising a seating or seat ring fixed in a wall of a chamber suitable for receiving the liquid phase, with a port leading to an exhaust space, and a valve member displaceable between closing and opening positions along a path defined by guide means, and adapted to block the port in the closing position, means responsive to the liquid phase level in the chamber governing the opening of the valve member.

BACKGROUND OF THE INVENTION

The invention developed in the course of operating a steam supply network in urban heating. The distribution takes place at a maximum temperature of about 235° C., the effective pressure being between 21 and 5 bar, according to the locations to which steam is delivered. When the amount of steam supplied is small, or when the pressure rises rapidly in the pipelines, the steam reaches saturation and condensate appears, which it is necessary to discharge in order to keep the steam dry.

Reservoirs known as drain bottles, having their bottom connected to seperators, are disposed at low points of the pipelines, or at intermediate points on long pipelines of uniform slope.

These separators are generally of the so-called "closed float" type; and they comprise, in a chamber which communicates with the drain bottle, a valve leading to an exhaust space, usually the condensate return pipe. The valve, which is biased closed by the pressure obtaining in the chamber, is caused to open by a float acting through a lever. When the condensate in the chamber reaches a certain level, the float opens the valve, and the condensate is expelled into the exhaust space, until, as the level drops, the valve closes.

The device is usually completed by a thermostatic separator, for evacuating the non-condensing gases. As long as the chamber contains condensate and steam only, it is substantially at the temperature of the steam, since any cooling is compensated by condensation of steam. If non-condensables are mixed with the steam, the equilibrium temperature of the chamber is defined by the temperature of condensation of the steam at its partial pressure in the chamber. The thermostatic separator is at a lower temperature, and it opens until the non-condensables have been discharged.

To return to the condensate discharging valve, it should be noted that it works under very severe conditions. It is generally immersed in condensate at a temperature above 200° C., the condensate consisting of pure but highly corrosive water, which may even be contaminated with ammonia, and it discharges an emulsion of water and steam at high velocity, which is thus very erosive, because the throttling of condensate in the valve port causes partial re-evaporation of the condensate. Moreover, when the amount of steam delivered is large, and the pressure in the network drops, the condensate in the chamber re-evaporates. and the closed valve is exposed to dry live steam.

Closed float separating valves generally consist of a ball connected to one arm of a lever whose other arm carries the float, and of a seating with a circular port on which the ball comes to rest. A certain amount of play between the ball and the lever arm which carries it permits correct location of the ball on the port.

It is very important that these valves should provide a first-class seal in the closed position. As a matter of fact, one metric ton of steam costs 60-100 French francs, by reason both of the treatment necessary for steam generator feedwater and of the enthalpy of the steam (of the order of 2.79 gigajoules per metric ton). However, the best separators currently available on the market manifest losses of the order of 3 kg steam per hour. This corresponds to about 7 cc per second at 10 bar, or again 0.8 cc per second of condensate. This may appear a modest amount. However, it corresponds, over a year, to 26 metric tons of steam i.e., to a loss of about 2000 French francs per annum. This amount of money is of the same order to magnitude as the price of the separator itself.

It is very difficult to make a precise analysis of the causes of loss of sealing capacity in separating valves which work at temperatures of the order of 200° C. and pressures up to about 20 bar. This is because of difficulties of in-service observation, and of the small dimensions of these valves. On this latter point, it may be remarked that, in order to limit the overall dimensions of the separators to reasonable values, it has been found necessary to use floats of several hundred cc, at the end of lever arms of about 20 cm length. In order that the float shall be capable for manoeuvering the valve member when it is forced against the port by the pressure which obtains in the separating chamber, the diameter of the port orifice should be less than 5 mm and the stroke of the valve into its open position of the order of a millimeter.

A little thought will show that the causes of the relatively mediocre sealing capacity of conventional separating valves are the impacts of the valve member on the seating during closure, by reason of the condensate discharge speed during separation, and inaccurate self-centering of the valve ball on the periphery of the port. Especially if the ball is not exactly centred when presented to the port at closure, the result can be a wear distortion of a region of the periphery of the port.

OBJECT OF THE INVENTION

The object of the invention is to provide a separating valve having losses which remain less than about a tenth of the losses of conventional valves i.e., which are lower than 0.3 kg/h of steam.

SUMMARY OF THE INVENTION

Towards this object, the invention provides a separating valve for discharging the liquid phase of a pressurized two-phase fluid, comprising a seating fixed in a wall of a chamber suitable for receiving the liquid phase, with a port leading to an exhaust space, and a valve member displaceable between closing and opening positions along a path defined by guide means, and adapted to block the port in the closing position, means responsive to the liquid phase level in the chamber governing the opening of the valve member, characterized in that the guide means consist of a tubular sleeve projecting from a flat face of the seating and coaxial with the port, and the valve member comprises a shank adapted for movement with sliding clearance in the sleeve, and, directed toward the face of the seating, a flat plate from which projects a centred valve needle of truncated conical shape, the valve member, together with the sleeve and the seating, thus defining an annular space communicating with the chamber by a plurality of passageways which open into the periphery of the annular space in line with the flat face.

With this arrangement, the centering of the valve member in the port is assured with a certain precision by guiding the valve shank in the sleeve of the seating. Moreover the conical shape of the valve needle promotes a shockless engagement with the port on closing. In addition, the advance of the valve needle during closure is damped by the existence of the annular space and by the disposition of the passageways which put it into communication with the chamber. In operation, the condensate penetrates, flush with the seating face, with a certain velocity, and is then deflected by the flat plate of the shank and escapes along the valve needle. Reaction gives rise to a dynamic force on the shank plate, which acts in opposition to the pressure.

Furthermore, the dynamic reactions of the escaping condensate between the valve needle and the walls of the seating port promote centering of the valve needle in the port, in the course of its forward motion.

According to an advantageous variant of the invention, the cam which terminates the second arm of the float lever engages in a neck formed in the shank of the valve member, while giving the latter a freedom for relative movement along its own axis.

This arrangement makes the valve member relatively independent of the float, especially during the opening and closing phases, where the displacements of the float could give rise to oscillating components. This arrangement furthermore increases the difference between the liquid levels corresponding respectively to closure and opening of the valve. Finally, on closure, the valve member can take its position freely, before the action of the cam gives rise to a forced engagement of the valve needle in the opening.

For preference the length of play lies between 0.1 and 0.8 millimeter.

In a preferred arrangement, the play is adjustable, especially by means of a screw which is held in an extension of the first lever arm and, in the closing position, bears against the centre of the rear part of the valve member, in a substantially axial manner.

BRIEF DESCRIPTION OF THE DRAWINGS

Secondary characteristics and the advantages of the invention will also appear from the following description given by way of example, with reference to the accompanying drawings in which:

FIG. 2b is a section in plan of the valve of FIG. 2a;

FIG. 3b is a plan view, partially cut away, of the separator of FIG. 3a;

DESCRIPTION OF AN EMBODIMENT OF THE PRIOR ART

Figure 1:
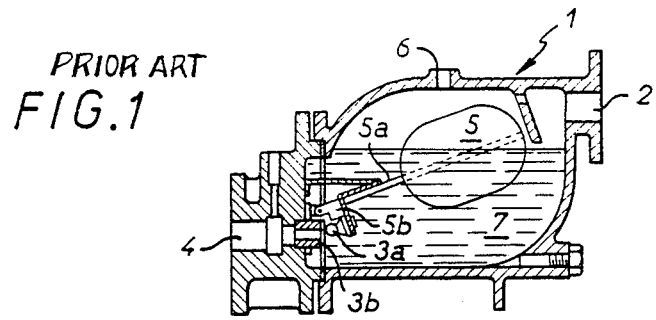
FIG. 1 is a representation of a closed float separator according to the state of the art.

The separator according to the state of the art shown in FIG. 1 comprises a chamber 1, communicating with a drain bottle, not shown, by way of a port 2. The condensate from a pressurized steam supply network is collected in the drain bottle, from which it passes to 7 in the lower part of the chamber 1.

The separator comprises a valve, consisting of a valve member 3a in the form of a ball, and of a seating 3b, located below the surface level of the condensate 7. Engagement of the ball 3a on the periphery of the port of the seating 3b is governed by means responsive to the level of condensate 7, consisting of a float 5 at the end of a first lever arm 5a, while the ball is held at the end of a second lever arm 5b, substantially perpendicular to the first arm 5a.

Beyond the valve 3a, 3b there is locatd a conduit 4, which leads to an exhaust space, which space, in a steam supply network, is constituted by the return pipelines for feeding condensate to the steam generator.

In the upper part of the chamber 1 there is located an outlet 6 for blowing-off non-condensables. This outlet 6 is generally equipped with a thermostatic valve. Since the space above the condensate 7 is full of steam, the latter is in equilibrium with the condensate on the one had, and with the supply network on the other hand, so that the steam is necessarily very sensitive to the supply temperature. However, if non-condensables such as air manage to penetrate into the chamber 1 above the condensate 7, they are likely to be cooled on contact with the walls. The thermostatic valve then opens, until the non-condensables have been exhausted and the thermostatic valve is surrounded by steam.

It will also be understood that, when the level of condensate 7 in the chamber 1 reaches a certain value, the hydrostatic pressure on the float 5 at the end of the lever arm 5a will exceed the force due to the pressure on the valve member 3a at the end of the second level arm 5b. The valve 3a, 3b opens, and the condensate is expelled through the conduit 4 by the effect of the pressure which obtains in the chamber 1.

It will be noted that, if the valve member 3a is free to retreat to a substantial distance, the differences in compressive thrust between the rear and front parts of the ball 3a will be small, and the float 5 has a tendency to emerge from the condensate 7, because the hydrostatic thrust is limited to compensating for the weight. The differences of condensate level between the opening and closing positions will be substantial, which permits a relatively significant quantity of condensate to be discharged in one operation. The counterpart to this is that in the later stages of closure of the valve 3a 3b, the valve member 3a is subjected to raised pressure differences between its front and rear parts, without the hydrostatic pressure on the float 5 offering any resistance to these pressure differences. Closure is thus violent. Since the valve member 3a should be centred on the port of the seating 3b, the closure impacts can cause eccentric wear of the edges of the orifice, and the valve loses some of its fluid-tightness.

It may be observed that the self-centering of the ball against the port of the seating implies the valve member ball 3a is guided with play by the second lever arm 5b, so that the ball is offered up to its seating in an almost necessarily eccentric fashion.

DETAILED DESCRIPTION OF THE PRESENTLY PREFERRED EMBODIMENTS

The First Embodiment

Figure 2A:
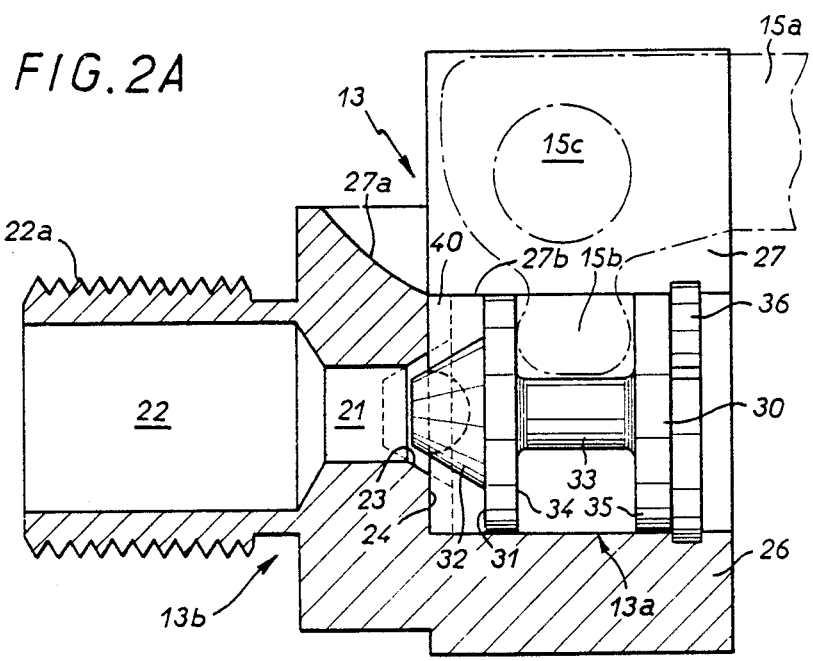
FIG. 2a is a section in elevation of a separating valve according to the invention.
Figure 2B:
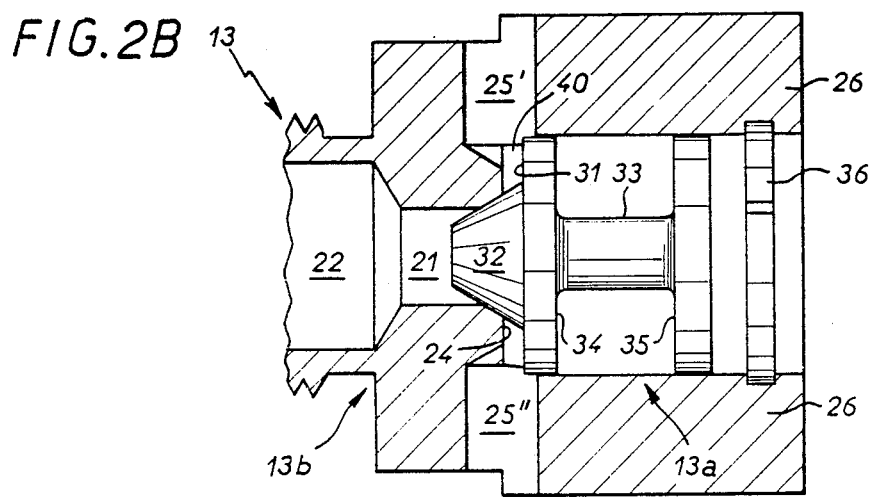

In the embodiment of the invention represented in FIGS. 2a and 2b, a valve 13 as a whole comprises a seating 13b and a valve member 13a with rectilinear displacement. The seating 13b comprises a flat face 2 in which is machined a precision-made cylindrical port 21 which widens toward the valve member 13a in a truncated conical flare 23. Behind the port 21, the seating continues as an enlarged feed pipe 22 at the centre of a threaded spigot 22a by which the seating 13b will be secured to the wall of the separating chamber, as can be better seen by reference to FIG. 3a.

Figure 3A:
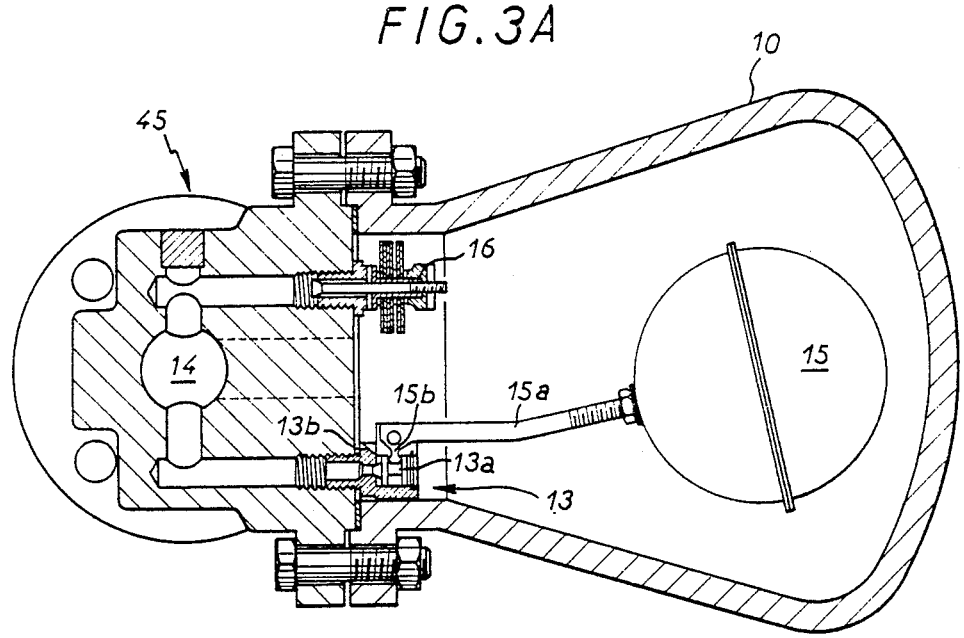
FIG. 3a is a section in elevation of a separator incorporating a valve according to the invention.

A cylindrical sleeve 26, in which the valve member 13a can slide, projects from the flat face 24. The sleeve 26 is longitudinally divided by a machined slot 27, where a second lever arm 15b is housed for pivoting about a transverse axis 15c. Perpendicularly of the second lever arm 15b there extends a first lever arm 15a, at the end of which a float 15 is placed (FIG. 3a).

The valve member 13a comprises a shank 30 adapted for sliding displacement within the sleeve 26. The shank 30 is terminated at its front part by a flat plate 31, from which there projects centrally a truncated conical valve needle 32, which is complementary to the flare 23 of the port 21 of the seating 13b.

The valve needle 32 is coated with a layer of "Stellite", and the flare 23 is obtained by grinding against the needle 32. The shank 30 is recessed by a neck 33 laterally limited by flat faces 34 and 35. As can be seen in FIG. 2a, the second lever arm 15b ends in a rounded cam which bears against the faces 34 and 35, in such a way that the pivoting of the lever 15b, 15a about the axis 15c causes the displacement of the valve member 13a in the sleeve.

The stroke of the valve member 13a is limited at the rear by abutment against a split ring 36 which is housed in a groove formed in the sleeve 26. It will be clear that the ring 36 is placed in position, during the assembly of the valve, after the valve member 13a has been inserted in the sleeve 26.

As can be seen from FIGS. 2a and 2b, an annular space 40 is defined by the flat face 24 of the seating, the internal wall of the sleeve 26, the flat front plate 31 of the shank 30, and the valve needle 32. The annular space 40 communicates with a separating chamber 10 (see FIG. 3a) by three passageways. A first passageway 27b is formed by the prolongation of the slot 27 as far as the flat face 24 of the seating 13b, which grooves the seating at one end in a circular arc 27a. Two lateral passageways 25' and 25" are formed perpendicularly to the axis of the sleeve 26. The axes of these passageways are colinear and horizontally disposed, they intersect the axis of the sleeve 26, and they lie in the plane of the flat face 24 of the seating 13b. The bores which constitute these passageways 25' and 25" terminate just beyond the inner cylindrical surface of the sleeve 26, and the apices of their terminal cones are located at opposite ends of a diameter greater than that of the flare 23.

It will be understood that the outlets of the passageways 27b, 25' and 25" into the annular space 40 go to make the entry flow into the space 40 oblique with respect to the radial directions, and compel it in the direction of the flat plate 31 of the valve member 13a.

Figure 3B:
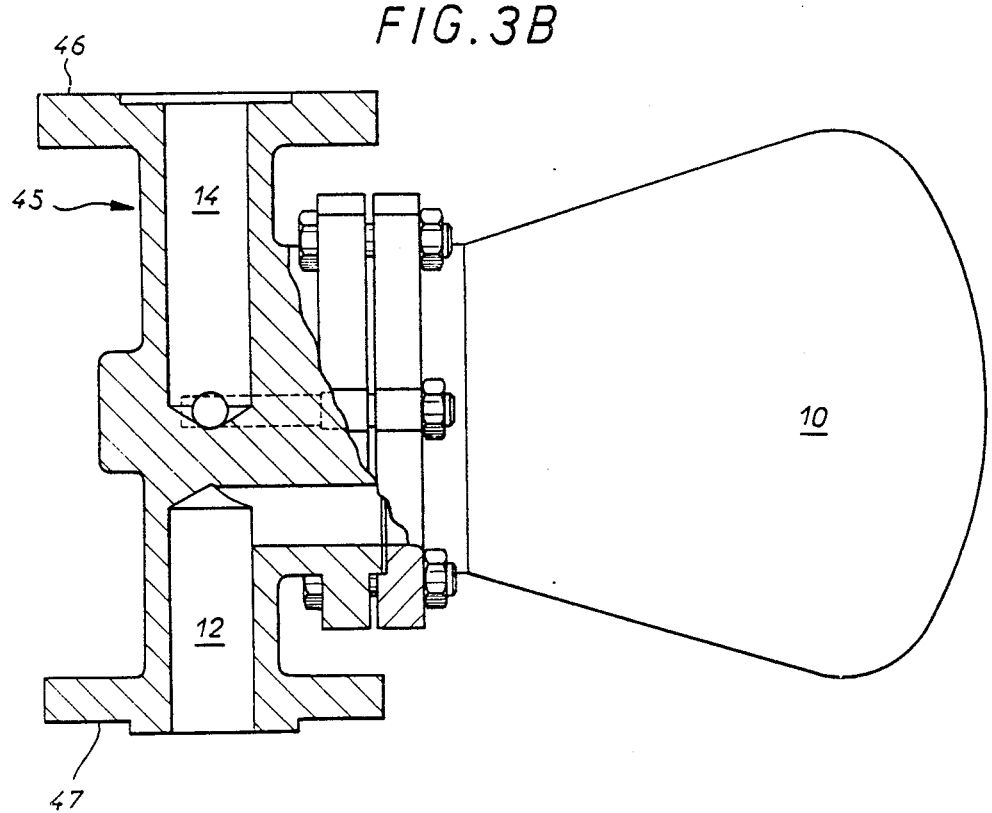

Referring to FIGS. 3a and 3b, where the scale does not allow the structure of the valve 13 to appear, it is seen that the separating chamber 10 is of pear shape and is mounted on a flanged base 45, equipped with lateral flanges 46 and 47 for connection respectively to the exhaust space by a channel 14 and to the drain bottle by a channel 12.

Apart from the valve 13 with its operating float 15, a thermostatic valve 16 is mounted on the base 45. As in the conventional arrangement of FIG. 1, the separating valve 13 is located in the lower part of the chamber 10 so as to be normally immersed in the condensate, whereas the thermostatic valve 16 is located in the upper part of the chamber 10, so as to be in a condition to evacuate the non-condensables into the exhaust space by way of the channel 14.

The opening control of the valve 13 by the float 15 is practically the same as the opening control represented in FIG. 1. However, the opening amplitude is limited by the presence (FIGS. 2a, 2b) of the ring 36, in such a way that the amount of condensate flowing is limited, not only by throttling between the valve needle 32 and the seating 13b, but likewise by the upstream throttling by the passageways 27b, 25' and 25".

In addition, the passageways 27b, 25' and 25" produce streams wich, by reason of their obliqueness as previously defined, become deflected by the flat plate 31 and the valve needle 32 before passing through the port 21. The reaction which arises from this deflection is opposed to the thrust on the rear face of the shank 30 which arises from the pressure in the chamber 10. The closing of the valve 13 is thus less violent than in the case of the separator of FIG. 1.

Moreover, the displacement of the valve member 13a in the sleeve 26 takes place with a minimal lateral play, and the reciprocal centering of the flare 23 and the valve needle 32 has been guaranteed by the grinding, which was carried out under the same conditions of guidance as the sliding by which the valve closes.

Lastly, the radial reactions on the valve member 13a of the streams emerging from the passageways 25' and 25" cancel out, while the vertical reaction of the stream emerging from the passageway 27b goes to compensate the tendency of the valve member 13a to hammering, resulting from the eccentric application of the head of the second lever arm 15b to the face 35 of the neck 33.

It can be seen that all the structural arrangements of the valve according to the invention will cooperate to ensure the reproducibility of the relative position of the valve member with respect to the seat, in the closed position of the valve.

Tests carried out on prototypes have also shown that the service losses remain lower than the envisaged limit of 0.3 kg/hour of steam, under 20 bar and at the corresponding saturation temperature of 215° C.

The Second Embodiment

Figure 4:
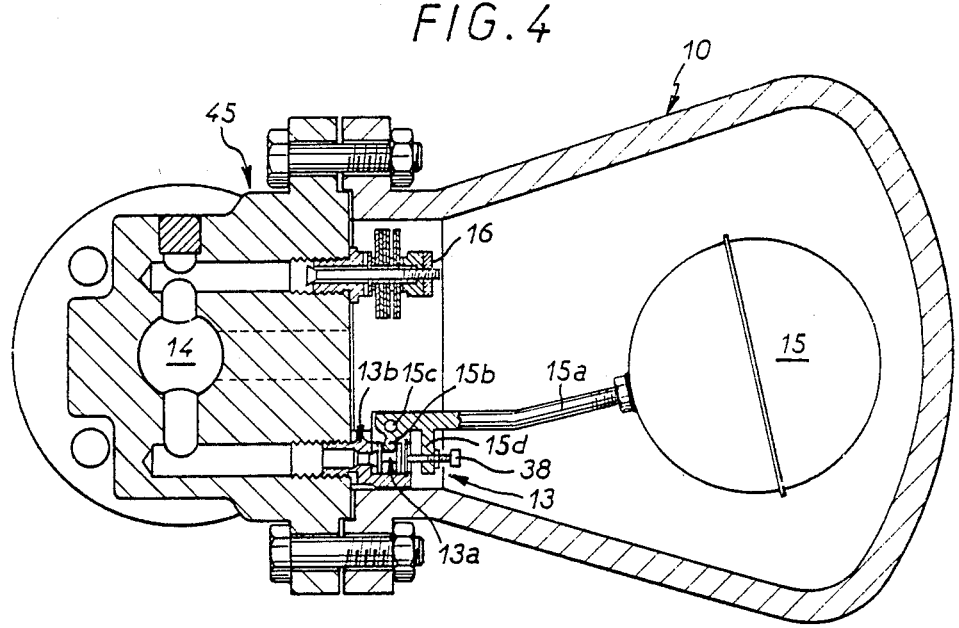
FIG. 4 is a vertical section, similar to that of FIG. 3b, of a separator incorporating a variant of the valve according to the invention.
Figure 5:
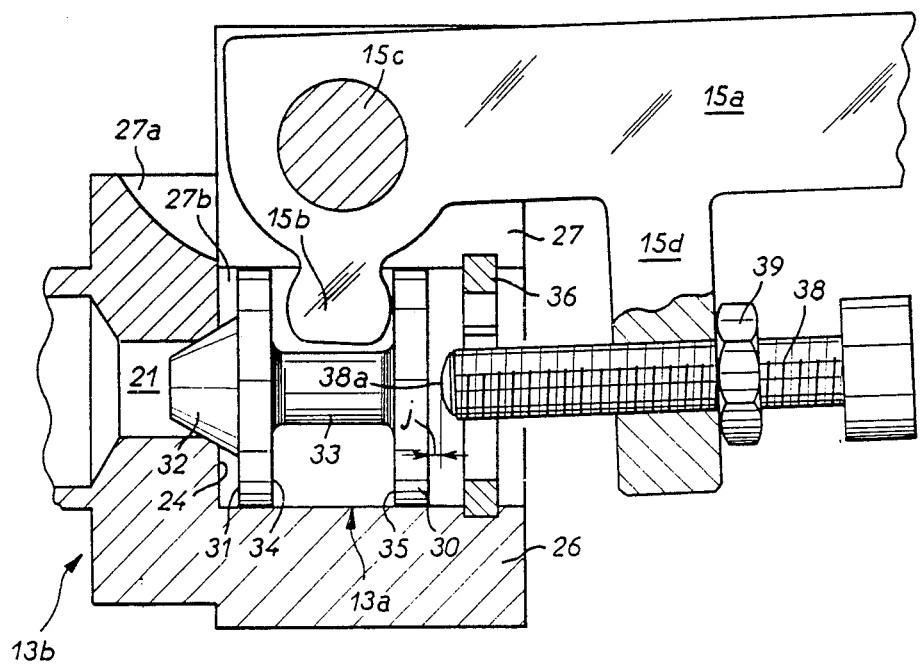
FIG. 5 is a vertical section of the separating valve shown in FIG. 4.

In the modification represented in FIGS. 4 and 5, and as can be better seen in the latter, the second arm 15b enters into the neck 33 as a cam, between the faces 34 and 35, with a substantial play, equal to about half of the possible stroke of the valve member 13a, between its closed position represented, and its fully open position in which the rear plate of the shank 30 abuts the elastic ring 36.

The first arm 15a of the float-carrying lever comprises a downwardly directed extension 15d, which passes beyond the axis of the valve member 13a. The projection 15d comprises an internally threaded hole which takes a regulating screw 38, equipped with a lock nut 39. This hole is coaxial with the valve member 13a, when the valve needle 32 is close to its seating. The front part 38a of the screw 38 is rounded for bearing against the rear plate of the shank 30 of the valve member 13a.

As shown in FIG. 5, when the valve member 13a is in its closed position, while the rear flank of the second arm 15b is still in contact with the rear face 35 of the neck 33, play j is defined between the end of screw 38 and the shank of the valve member, play j being adjustable by rotating the screw 38.

In practice the play j can be of the order of 0.1 to 0.8 mm, for a total valve member stroke lying between 1 and 2 mm. This play is such that, in the closed position, the front part 38a of the screw 38 bears against the shank 30 of the valve member 13a before the second arm 15b engages the front face 34 of the neck 33. Then the valve member 13a is secured in its closed position by the thrust of the screw 38 against the shank of the valve member.

The play j takes practically no part in opening the valve 13, when the float 15, under the effect of the hydrostatic lift of the condensate in the chamber 10, proceeds to open the valve member 13a, against the pressure obtaining in the chamber 10, by engagement of the rear flank of the second arm 15b (as a cam) on the rear face 35 of the neck 33, since the front part 38a of the screw 38 is already distinctly separated from the shank 30 of the valve member 13a.

When the valve 13 begins to open, the escape of the condensate, guided by the passageways (not shown here) to pass into the port 21 after deflection by the front plate 31 of the valve member 13a and the truncated conical valve needle 32, has the effect of developing a counter-pressure against the front plate 31 which partially compensates for the pressure of the condensate against the rear plate of the shank 30. The float 15 can thus return to floating at the surfce of the condensate, while a reduced force of the second arm 15b of the float lever displaces the valve member 13a to its fully open position, by the action of the second arm 15b on the rear face 35 of the neck 33.

According as the condensate escapes through the channel 14, the float 15 descends in the chamber 10, allowing the valve member 13a to advance and recover its closing position under the combined effect of the static pressure of condensate on the rear plate of the shank 30 of the valve member 13a, the dynamic pressure of the condensate jets on the front face 31 and on the truncated conical valve needle 32, with the restraining force of the second arm 15b on the rear face 35 of the neck 33 of the shank 30 of the valve member 13a. In this phase, oscillations of the float 15 at the surface of the condensate do not disturb the thrust of the valve member 13a against its seating 13b, because of the presence of the play of the second arm 15b in the neck 33.

Furthermore, when the separator is closed, a pressure drop is produced in the steam supply network, the condensate present in the chamber 10 then evaporates at least partially, and its level may drop below that of the separating valve 13. It is known that the tightness of a valve or a joint is more difficult to obtain for vapours or gses than for liquids. But here, when the condensate level has dropped below that of the valve 13, the weight of the float 15 applied to the end of the first lever arm 15a increases the thrust of the front part 38a of the screw 38 on the rear plate of the shank 30 of the valve member 13a, with a substantially axial force, so as to perfect the sealing effect of the needle 32 in the seating 13b.

The invention is not of course limited to the examples described, but includes all modifications of design within the scope of the claims.

In particular, the valve has been described in the context of a closed float separator. It will be equally applicable to so-called open float separators. These separators comprise a float in the form of a bell, with a narrow vent at the top of the bell. The inlet from the drain bottle takes plate beneath the bell. As long as steam arrives below the bell, the latter floats on the condensate and pushes a valve into closure, by the action of a lever. If condensate arrives, the bell empties of steam through the vent, and falls, opening the valve. When the condensate ceases to be delivered, the steam once more ascends within the bell, and it closes the valve.

The valve of the invention could also be used, for example for separators for water and oil in compressed air generators.

Moreover, in the embodiment represented in FIGS. 4 and 5, the screw 38 could be replaced by a non-adjustable element, even if this arrangement necessitates a greater precision in machining.

What we claim is:

1. A separating valve for discharging the liquid phase of a pressurized two-phase fluid, said separating valve comprising a seating fixed in a wall of a chamber suitable for receiving the liquid phase with a port leading to an exhaust space and a valve member displaceable between closing and opening positions along a path defined by guide means, and adapted to block the port in the closing position, means responsive to the liquid phase level in the chamber governing the opening of the valve member, wherein the guide means comprises a tubular sleeve projecting from a flat face of the seating and coaxial with the port, and the valve member comprises a shank adapted for movement with sliding clearance in the sleeve, and directed toward the face of the seating, a flat plate from which projects a centred valve needle of truncated conical shape, the means responsive to the liquid phase level comprising a closed float at the end of a first arm of a lever whose second arm ends in a cam engaging in an annular neck of the shank of the valve member, and passing through a longitudinal slot formed in the sleeve in a plane passing through the axis of said sleeve, the valve member together with the sleeve and the seating thus defining an annular space communicating with the chamber by a plurality of passageways which open into the periphery of the annular space in line with the flat face, said plurality of passageways comprising on the one hand an extension of the longitudinal slot and on the other hand two bores diametrically aligned on an axis perpendicular to the plane of the slot and tangentially oriented with respect to the flat face of the seating, said bores extending from the outside to the inside of the sleeve, while stopping short at a distance from the port.

2. A valve according to claim 1, wherein the sleeve comprises a rear abutment defining the opening position of the valve member.

3. A valve according to claim 1, wherein the cam which terminates the second arm of the lever of the float engages in the neck machined in the shank of the valve member while allowing the latter a free play along its own axis.

4. A valve according to claim 3, wherein the free play is between 0.1 and 0.8 millimeter.

5. A valve according to claim 3, wherein the lever of the float is equipped with means for adjusting the length of the free play.

6. A valve according to claim 5, wherein said means intended to regulate the length of the free play comprise a screw engaged in an extension of the lever, the screw being disposed substantially along the axis of the valve member and having one end which comes into engagement substantially against the centre of the rear part of the valve member.

7. A valve according to claim 1, for a separator of the so-called "closed float" type, wherein while the axis of the port is horizontal, the seating is disposed within the chamber below the level at which the float acts to open the valve member.

8. A valve according to claim 1, wherein the needle is coated with a layer of "Stellite".

9. A separating valve for discharging the liquid phase of a pressurized two-phase fluid, said separating valve comprising a seating fixed in a wall of a chamber suitable for receiving the liquid phase with a port leading to an exhaust space and a valve member displaceable between closing and opening positions along a path defined by guide means, and adapted to block the port in the closing position, means responsive to the liquid phase level in the chamber governing the opening of the valve member, wherein the guide means comprises a tubular sleeve projecting from a flat face of the seating and coaxial with the port, and the valve member comprises a shank adapted for movement with sliding clearance of the sleeve, and, directed toward the face of the seating, a flat plate from which projects a central valve needle of trucated conical shape, the means responsive to the liquid phase level comprising a closed float at the end of a first arm of a lever whose second arm ends in a cam engaging in an annular neck of the shank of the valve member, and passing through a longitudinal slot formed in the sleeve in a plane passing through the axis of said sleeve, the cam which terminates the second arm of the lever of the float engaging in the neck machined in the shank of the valve member while allowing the latter a free play along its own axis, the lever of the float being equipped with means for adjusting the length of the free play, the valve member together with the sleeve and the seating thus defining an annular space communicating with the chamber by a plurality of passageways which open into the periphery of the annulr space in line with the flat face.

10. A valve according to claim 9, wherein said means intended to regulate the length of the free play comprise a screw engaged in an extension of the lever, the screw being disposed substantially along the axis of the valve member and having one end which comes into engagement substantially against the centre of the rear part of the valve member.

* * * * *